(12) United States Patent
Kormann et al.

(10) Patent No.: US 8,454,854 B2
(45) Date of Patent: *Jun. 4, 2013

(54) GLYCERIN-CONTAINING ANTIFREEZING AGENT CONCENTRATES WITH CORROSION PROTECTION

(75) Inventors: Claudius Kormann, Schifferstadt (DE); Colin Irwin, Knutsford, WA (US); Matthias Kiefer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/043,836

(22) Filed: Mar. 9, 2011

(65) Prior Publication Data

US 2011/0163260 A1 Jul. 7, 2011

Related U.S. Application Data

(63) Continuation of application No. 11/816,941, filed as application No. PCT/EP2006/060213 on Feb. 23, 2006, now Pat. No. 7,927,505.

(30) Foreign Application Priority Data

Feb. 28, 2005 (EP) ..................................... 05004305
Mar. 1, 2005 (EP) ..................................... 05004450

(51) Int. Cl.
*C09K 5/00* (2006.01)

(52) U.S. Cl.
USPC .................... 252/74; 252/75; 252/76; 252/77

(58) Field of Classification Search
None
See application file for complete search history.

(56) References Cited

U.S. PATENT DOCUMENTS

| | | | |
|---|---|---|---|
| 2,388,155 A | 10/1945 | Keller et al. | |
| 4,000,079 A | 12/1976 | Rasp et al. | |
| 4,455,248 A | 6/1984 | Wood | |
| 4,561,990 A | 12/1985 | Darden | |
| 5,997,763 A | 12/1999 | Pabon, Jr. et al. | |
| 6,802,988 B1 | 10/2004 | Wenderoth et al. | |
| 6,818,147 B2 | 11/2004 | Wenderoth et al. | |
| 2002/0171063 A1 | 11/2002 | Evans et al. | |
| 2003/0164470 A1* | 9/2003 | Wenderoth et al. | 252/71 |
| 2003/0198847 A1 | 10/2003 | Jeffcoate et al. | |
| 2004/0104375 A1 | 6/2004 | Pellet et al. | |
| 2004/0119044 A1 | 6/2004 | Wenderoth et al. | |
| 2004/0227124 A1 | 11/2004 | Turcotte et al. | |
| 2007/0034825 A1* | 2/2007 | Wenderoth et al. | 252/70 |

FOREIGN PATENT DOCUMENTS

| | | |
|---|---|---|
| AR | 028489 61 | 3/2007 |
| AR | 024796 B1 | 11/2007 |
| DE | 34 13 416 | 10/1984 |
| DE | 195 47 499 | 5/1997 |
| DE | 196 05 509 | 8/1997 |
| DE | 101 63 337 | 7/2003 |
| EP | 0 229 440 | 6/1990 |
| EP | 0 479 470 | 4/1992 |
| EP | 0 530 430 B1 | 3/1993 |
| EP | 0 552 988 | 10/1995 |
| EP | 0 816 467 | 1/1998 |
| EP | 1 010 740 | 6/2000 |
| EP | 1 416 563 | 3/2007 |
| RU | 2 009 158 C1 | 7/1991 |
| WO | 92 01029 | 1/1992 |
| WO | WO 01/32801 A1 | 5/2001 |
| WO | 02 072728 | 9/2002 |
| WO | 02 090462 | 11/2002 |

OTHER PUBLICATIONS

European Opposition issued Jan. 23, 2012, in European Patent Application No. 20060708473, filed Feb. 23, 2006.
Submission in EP Opposition, (2012).
Parts of a product folder of Texaco Chemical Company titled Ethylene Glycols, dated 1981.
Campbell, J.M. (1990). Gas Conditioning and Processing. vol. 1: 172.

* cited by examiner

*Primary Examiner* — Necholus Ogden, Jr.

(74) *Attorney, Agent, or Firm* — Oblon, Spivak, McClelland, Maier & Neustadt, L.L.P.

(57) ABSTRACT

The present invention relates to antifreeze/anticorrosion concentrates comprising from 10 to 50% by weight, based on the total amount of the concentrate, of glycerol, to processes for preparing such concentrates from superconcentrates, to aqueous coolant compositions from these concentrates, and to their use, for example in internal combustion engines.

22 Claims, No Drawings

GLYCERIN-CONTAINING ANTIFREEZING AGENT CONCENTRATES WITH CORROSION PROTECTION

This application is a continuation of application Ser. No. 11/816,941, filed Aug. 23, 2007, now pending; which is a 371 of PCT/EP2006/060213, filed Feb. 23, 2006, both incorporated herein by reference.

The present invention relates to antifreeze/anticorrosion concentrates, to processes for preparing such concentrates from superconcentrates, to aqueous coolant compositions from these concentrates and to their use.

Coolant compositions for the cooling circuits of internal combustion engines of, for example, automobiles usually comprise alkylene glycols, mainly ethylene glycol and/or propylene glycol, as the antifreeze component.

In addition to further components, corrosion inhibitors in particular are present.

Especially in modern internal combustion engines, thermal stresses are attained which place high demands on the materials used. Any type and any extent of corrosion constitute a potential risk factor which can lead to a shortening in the running time of the engine and to a reduction in the reliability. In addition, a multitude of different materials is increasingly being used in modern engines, for example cast iron, copper, brass, soft solder, steel, and magnesium and aluminum alloys. This multitude of metallic materials results additionally in potential corrosion problems, especially at the points at which different metals are in contact with one another. Especially at these points, a wide variety of different types of corrosion may occur comparatively readily, for example pitting corrosion, crevice corrosion, erosion or cavitation.

The coolant compositions likewise have to be compatible also with nonmetallic constituents of the cooling circuit, for example elastomers and plastics from hose connections or seals, and must not alter them.

Furthermore, the coolant composition is of crucial importance in heat transfer in modern internal combustion engines.

As well as coolant containers which already comprise the ready-to-use coolant compositions mentioned, antifreeze/anticorrosion concentrates are becoming ever more important. It is necessary merely to add water to these concentrates in order to obtain the ready-to-use coolant compositions.

Antifreeze/anticorrosion concentrates thus likewise comprise components which serve firstly to prevent freezing, i.e. for freezing point depression of the mixture, and secondly corrosion inhibitors which serve to prevent corrosion. The proportion of the anticorrosion component in the concentrate is typically up to 10% by weight based on the total amount of the concentrate. The proportion of the concentrate in the ready-to-fill radiator protectant is typically from 10 to 60% by weight. Concentrates may already comprise small amounts of water.

Especially for transport reasons, superconcentrates which have a reduced amount of antifreeze component, i.e. usually ethylene glycol, are additionally obtainable in order to provide a very compact container. In this case, the amount of antifreeze component removed from a concentrate is usually such that the further constituents just remain in dissolved form.

Antifreeze/anticorrosion concentrates are therefore obtainable from superconcentrates by mixing in a certain amount of antifreeze component and, if appropriate, some water. The proportion of the superconcentrate in the concentrate is typically from 3 to 60% by weight.

As mentioned above, alkylene glycols, mainly ethylene glycol and/or propylene glycol, usually form the main constituents of the antifreeze component.

The corrosion inhibitors which serve as the antifreeze component are known in the prior art. Antifreezes which comprise carboxylic acids, molybdates and triazoles are known from DE-A 195 47 449, EP-B 552 988 or U.S. Pat. No. 4,561,990.

EP-B 229 440 describes an anticorrosion component composed of an aliphatic monobasic acid, a dibasic hydrocarbyl acid and a hydrocarbyl triazole.

Specific acids as an anticorrosion component are described in EP-B 479 470. Quaternized imidazoles are disclosed in DE-A 196 05 509.

In addition to the typically used ethylene glycol and propylene glycol, EP-A 816467 also discloses higher glycols and glycol ethers as antifreeze components. Glycerol is also generally known as a possible constituent of the antifreeze component.

DE-A 3 413 416, US-A 2004/0104375 and WO-A 02/090462 mention, for example, glycerol as a possible freezing point depression component in addition to the customary glycols such as ethylene glycol.

WO-A 02/072728 refers to the reduced toxicity of ethylene glycol-based antifreeze concentrates by addition of small amounts of glycerol.

The corrosion protection and also the achievable freezing points achieved with the mixtures and concentrates known to date are generally good. Nevertheless, owing to ever increasing performance of new internal combustion engines, there is a constant need for improved antifreeze/anticorrosion concentrates.

It is an object of the present invention to provide such antifreeze/anticorrosion concentrates which do not have the disadvantages of the prior art or at least have them in reduced form. These mixtures should have a balanced ratio of the corrosion protection, heat transfer and frost resistance properties.

The object is achieved by an antifreeze/anticorrosion concentrate comprising from 10 to 50% by weight, based on the total amount of the concentrate, of glycerol.

It has been found that the use of a certain range of amounts of glycerol in the concentrate can achieve improved properties of the antifreeze/anticorrosion concentrate.

The amount of glycerol is preferably from 15 to 35% by weight, especially preferably from 20 to 30% by weight, based on the total amount of the concentrate.

In this concentrate, alcohols selected from monohydric alcohols, dihydric alcohols, trihydric alcohols other than glycerol, polyhydroxy alcohols, ethers thereof or mixtures thereof may additionally be present as the antifreeze component.

Additional alcohols may be ethylene glycol, propylene glycol, diethylene glycol, dipropylene glycol, triethylene glycol, tetraethylene glycol, pentaethylene glycol, hexaethylene glycol, dipropylene glycol, tripropylene glycol, tetrapropylene glycol, pentapropylene glycol, hexapropylene glycol, monoethers of glycols such as the methyl, ethyl, propyl and butyl ethers of ethylene glycol, propylene glycol, diethylene glycol and dipropylene glycol. Preference is given to ethylene glycol and propylene glycol. Particular preference is given to ethylene glycol.

In the context of the present invention, the term "propylene glycol" refers to 1,2-propanediol.

The amount of antifreeze component (glycerol and additional alcohol or additional alcohols) is preferably at least 75% by weight based on the total amount of the concentrate.

The amount is more preferably at least 85% by weight, particularly preferably at least 90% by weight.

The amount of anticorrosion component is preferably from 1 to 70% by weight based on the total amount of the concentrate. The amount is more preferably from 2 to 35% by weight, particularly preferably from 3 to 8% by weight.

In a preferred embodiment, an antifreeze/anticorrosion concentrate according to the present invention additionally comprises at least one of the following components in an amount specified in each case, based on the total amount of the concentrate:

(a) up to 5% by weight of one or more aliphatic, cycloaliphatic or aromatic monocarboxylic acids having in each case from 3 to 16 carbon atoms in the form of their alkali metal, ammonium or substituted ammonium salts;

(b) up to 5% by weight of one or more aliphatic or aromatic di- or tricarboxylic acids having in each case from 3 to 21 carbon atoms in the form of their alkali metal, ammonium or substituted ammonium salts;

(c) up to 1% by weight of one or more alkali metal borates, alkali metal phosphates, alkali metal silicates, alkali metal nitrites, alkali metal or alkaline earth metal nitrates, alkali metal molybdates or alkali metal or alkaline earth metal fluorides;

(d) up to 5% by weight of one or more aliphatic, cycloaliphatic or aromatic amines which have from 2 to 15 carbon atoms and may additionally comprise ether oxygen atoms or hydroxyl groups;

(e) up to 5% by weight of one or more mono- or bicyclic, unsaturated or partly unsaturated heterocycles which have from 4 to 10 carbon atoms and may be benzofused and/or bear additional functional groups;

(f) up to 5% by weight of one or more tetra($C_1$-$C_8$-alkoxy) silanes (tetra-$C_1$-$C_8$-alkyl orthosilicates);

(g) up to 10% by weight of one or more carboxamides or sulfonamides;

(h) up to 1% by weight of one or more hard water stabilizers based on polyacrylic acid, polymaleic acid, acrylic acid-maleic acid copolymers, polyvinylpyrrolidone, polyvinylimidazole, vinylpyrrolidone-vinylimidazole copolymers and/or copolymers of unsaturated carboxylic acids and olefins.

The compounds of groups a) to g) are generally corrosion inhibitors.

Useful linear or branched-chain, aliphatic or cycloaliphatic monocarboxylic acids (a) are, for example, propionic acid, pentanoic acid, hexanoic acid, cyclohexyl acetic acid, octanoic acid, 2-ethylhexanoic acid, nonanoic acid, isononanoic acid, decanoic acid, undecanoic acid or dodecanoic acid. A suitable aromatic monocarboxylic acid (a) is in particular benzoic acid; additionally useful are also, for example, $C_1$- to $C_8$-alkylbenzoic acids such as o-, m-, p-methylbenzoic acid or p-tert-butylbenzoic acid, and hydroxyl-containing aromatic monocarboxylic acids such as o-, m- or p-hydroxybenzoic acid, o-, m- or p-(hydroxymethyl)benzoic acid or halobenzoic acids such as o-, m- or p-fluorobenzoic acid.

Typical examples of di- or tricarboxylic acids (b) are malonic acid, succinic acid, glutaric acid, adipic acid, pimelic acid, suberic acid, azelaic acid, sebacic acid, undecanedioic acid, dodecanedioic acid, dicyclopentadienedicarboxylic acid, phthalic acid, terephthalic acid and triazinetriiminocarboxylic acids such as 6,6',6"-(1,3,5-triazine-2,4,6-triyltriimino)trihexanoic acid.

All of these carboxylic acids of groups (a) and (b) are present in the form of alkali metal salts, in particular in the form of sodium or potassium salts, or in the form of ammonium salts or substituted ammonium salts (amine salts), for example with ammonia, trialkylamines or trialkanolamines.

Typical examples of corrosion inhibitors mentioned under (c) are sodium tetraborate (borax), disodium hydrogenphosphate, trisodium phosphate, sodium metasilicate, sodium nitrite, sodium nitrate, magnesium nitrate, sodium fluoride, potassium fluoride, magnesium fluoride and sodium molybdate.

When alkali metal silicates are also used, they are appropriately stabilized by customary organosilicophosphonates or organosilicosulfonates in customary amounts.

Possible aliphatic, cycloaliphatic or aromatic amines (d) having from 2 to 15, preferably from 4 to 8 carbon atoms, which may additionally comprise ether oxygen atoms, in particular from 1 to 3 ether oxygen atoms, or hydroxyl groups, in particular from 1 to 3 hydroxyl groups, are, for example, ethylamine, propylamine, isopropylamine, n-butylamine, isobutylamine, sec-butylamine, tert-butylamine, n-pentylamine, n-hexylamine, n-heptylamine, n-octylamine, isononylamine, di-n-propylamine, diisopropylamine, di-n-butylamine, mono-, di- and triethanolamine, piperidine, morpholine, aniline or benzylamine. Aliphatic and cycloaliphatic amines (d) are generally saturated.

The heterocycles (e) are, for example, monocyclic five- or six-membered systems having 1, 2 or 3 nitrogen atoms or having one nitrogen atom and one sulfur atom, which may be benzofused. It is also possible to use bicyclic systems composed of five- and/or six-membered rings having typically 2, 3 or 4 nitrogen atoms.

The heterocycles (e) may additionally bear functional groups, preferably $C_1$-$C_4$-alkoxy, amino and/or mercapto. The basic heterocyclic skeleton may of course also bear alkyl groups, in particular $C_1$-$C_4$-alkyl groups.

Typical examples of heterocycles (e) are benzotriazole, tolutriazole (tolyltriazole), hydrogenated tolutriazole, 1H-1,2,4-triazole, benzimidazole, benzothiazole, adenine, purine, 6-methoxypurine, indole, isoindole, isoindoline, pyridine, pyrimidine, 3,4-diaminopyridine, 2-aminopyrimidine and 2-mercaptopyrimidine.

For the tetra($C_1$-$C_8$-alkoxy)silanes (f), useful examples are tetramethoxysilane, tetraethoxysilane, tetra-n-propoxysilane or tetra-n-butoxysilane.

The amides (g) may optionally be alkyl-substituted on the nitrogen atom of the amide group, for example by a $C_1$-$C_4$-alkyl group. Basic aromatic or heteroaromatic skeletons of the molecule may of course also bear such alkyl groups. In the molecule, one or more, preferably one or two, amide groups may be present. The amides may bear additional functional groups, preferably $C_1$-$C_4$-alkoxy, amino, chlorine, fluorine, hydroxyl and/or acetyl; in particular, such functional groups are present as substituents on aromatic or heteroaromatic rings present.

Typical examples of such carboxamides and sulfonamides of group (g) are listed in DE-A 100 36 031.

In particular, typical examples of such carboxamides and sulfonamides of group (g) are listed below.

aromatic carboxamides:
benzamide, 2-methylbenzamide, 3-methylbenzamide, 4-methylbenzamide, 2,4-dimethylbenzamide, 4-tert-butylbenzamide, 3-methoxybenzamide, 4-methoxy-benzamide, 2-aminobenzamide (anthranilamide), 3-aminobenzamide, 4-amino-benzamide, 3-amino-4-methylbenzamide, 2-chlorobenzamide, 3-chlorobenzamide, 4-chlorobenzamide, 2-fluorobenzamide, 3-fluorobenzamide, 4-fluorobenzamide, 2,6-difluorobenzamide, 4-hydroxybenzamide, phthalamide, terephthalamide;

heteroaromatic carboxamides:
nicotinamide (pyridine-3-carboxamide), picolinamide (pyridine-2-carboxamide);

aliphatic carboxamides:
succinamide, adipamide, propionamide, hexanamide;

cycloaliphatic carboxamides having the amide moiety as a constituent of the ring:
2-pyrrolidone, N-methyl-2-pyrrolidone, 2-piperidone, ε-caprolactam;

aliphatic sulfonamides:
methanesulfonamide, hexane-1-sulfonamide;

aromatic sulfonamides:
benzenesulfonamide, o-toluenesulfonamide, m-toluenesulfonamide, p-toluene-sulfonamide, 4-tert-butylbenzenesulfonamide, 4-fluorobenzenesulfonamide, 4-hydroxybenzenesulfonamide, 2-aminobenzenesulfonamide, 3-aminobenzene-sulfonamide, 4-aminobenzenesulfonamide, 4-acetylbenzenesulfonamide.

In addition to this anticorrosion component of groups (a) to (g), it is also possible to use, for example, soluble magnesium salts of organic acids, for example magnesium benzenesulfonate, magnesium ethanesulfonate, magnesium acetate or magnesium propionate, hydrocarbazoles or quaternized imidazoles, as described in DE-A 196 05 509, in customary amounts as further inhibitors.

Of the above-listed additional ingredients of the inventive antifreeze/anticorrosion concentrates, preference is given to also using carboxylic acids of groups (a) and/or (b) and/or heterocycles of group (e).

In a particularly preferred embodiment, the inventive antifreeze/anticorrosion concentrates in each case additionally comprise up to 5% by weight, in particular from 0.5 to 3% by weight, of two different carboxylic acids from groups (a) and/or (b) and also from 0.05 to 5% by weight, in particular from 0.1 to 0.5% by weight, of one or more heterocycles from group (e).

These different carboxylic acids may, for example, be mixtures of an aliphatic monocarboxylic acid and an aliphatic dicarboxylic acid, of an aromatic monocarboxylic acid and an aliphatic dicarboxylic acid, of an aliphatic monocarboxylic acid and an aromatic monocarboxylic acid, of two aliphatic monocarboxylic acids or of two aliphatic dicarboxylic acids. Suitable heterocycles to be used additionally with preference here are in particular benzotriazole and tolutriazole.

The pH of the inventive antifreeze concentrates is typically in the range from 4 to 11, preferably from 4 to 10, in particular from 4.5 to 8.5. The desired pH may also be adjusted if appropriate by addition of alkali metal hydroxide, ammonia or amines to the formulation; solid sodium hydroxide or potassium hydroxide and aqueous sodium hydroxide or potassium hydroxide solution are particularly suitable for this purpose.

Carboxylic acids to be used additionally with preference are appropriately added directly as the corresponding alkali metal salts in order to lie automatically within the desired pH range. However, the carboxylic acids can also be added in the form of free acids and then neutralized with alkali metal hydroxide, ammonia or amines, and the desired pH range can be established.

As further customary assistants, the inventive antifreeze/anticorrosion concentrate may also comprise, in customary small amounts, defoamers (generally in amounts of from 0.003 to 0.008% by weight) and, for reasons of hygiene and safety in the event that it is swallowed, bitter substances (for example of the denatonium benzoate type) and dyes.

The inventive antifreeze/anticorrosion concentrates may be prepared by simple mixing of the individual components.

The inventive concentrates may also be prepared from, for example, commercially available superconcentrates.

Accordingly, the present invention further provides a process for preparing an antifreeze/anticorrosion concentrate, comprising the step of
mixing an antifreeze superconcentrate comprising corrosion inhibitors with a glycerol component, the component comprising glycerol in an amount which results in from 10 to 50% by weight based on the total amount of the mixture in the resulting mixture.

In this process, the weight ratio of superconcentrate to glycerol component is preferably in the range from 5:1 to 1:50. More preferably, it is in the range from 1:1 to 1:20.

The amount of glycerol is preferably at least 15% by weight, more preferably at least 20% by weight, based on the total amount of the glycerol component. Further constituents may be customary constituents of the antifreeze component, preferably ethylene glycol, and water.

The present invention also provides aqueous coolant compositions having a depressed freezing point, especially for radiator protection of internal combustion engines in the automobile sector, which comprise water and from 10 to 90% by weight, in particular from 20 to 60% by weight, of the inventive antifreeze/anticorrosion concentrates.

The present invention further provides for the use of inventive coolant compositions in systems where the frost protection of water (generally for the range from 0° C. to −40° C., in particular from −20° C. to −35° C.) and simultaneously the corrosion protection of metal casings of water-comprising vessels are to be ensured. Here, the cooling circuits of internal combustion engines, especially in automobiles such as passenger vehicles and trucks, in particular are of interest. The inventive coolant compositions may also be used in stationary engines, in hot water circuits of central heating systems, in resistance-heated radiators, in solar-powered circuits, but also in coolant-cooled circulation systems.

EXAMPLES

The radiator protectants HK1, HK2 and HK3 detailed in the examples which follow are commercial typical superconcentrates which have a comprehensively tested and proven property profile. The addition of glycerol in inventive proportions further improves this property profile.

Example 1

Determination of the Ice Formation Point of HK1 with/without Glycerol

HK1 is a mixture of 32.6 parts of ethylene glycol, 26.9 parts of aqueous potassium hydroxide solution (50% by weight), 33 parts of ethylhexanoic acid, 2.2 parts of sodium molybdate dihydrate, 2.4 parts of tolutriazole, 2.8 parts of water and assistants (<0.2 part).

|  | HK1 with glycerol % by wt. | HK1 without glycerol % by wt. | Specification: British Standard BS6580 |
|---|---|---|---|
| HK1 | 7 | 7 |  |
| Glycerol | 25 | — |  |
| Ethylene glycol | 66 | 91 |  |
| Water | 2 | 2 |  |

-continued

|  | HK1 with glycerol % by wt. | HK1 without glycerol % by wt. | Specification: British Standard BS6580 |
|---|---|---|---|
| Ice formation point, ASTM D 1177, concentration: 50% by volume | −36.0° C. | −37.5° C. | <−33° C. |

The comparison shows that glycerol, as an antifreeze component in a blend with ethylene glycol, enables on-spec antifreeze protection.

Example 2

Heat Transfer Corrosion Test of HK1 with/without Glycerol

The test is carried out according to ASTM D 4340 with HK1 with/without glycerol in the composition as in example 1 at a concentration of 25% by volume (water type: ASTM D 4340):

| Cast aluminum test metal | Weight change mg/cm$^2$ | Appearance of the metal |
|---|---|---|
| HK1 with glycerol | −0.05 | Gray tarnishing, low deposits |
| HK1 without glycerol | +0.30 | Light-colored tarnishing |
| Specification: British Standard BS 6580 | <1 | No information |

The comparison shows that the glycerol-comprising mixture leads to a better corrosion result because the change in weight of the aluminum specimen is lower.

Example 3

Dynamic Corrosion Experiment in the Hot Corrosion Circulation Apparatus

The hot corrosion circulation apparatus is designed analogously to the known apparatus according to FVV [German Research Foundation for Combustion Engines] book R 443 1986. When modifications from the FVV apparatus and procedure are selected, they are clear from the tabular overview which follows. For the purpose of the present invention, the more severe operating mode HK 96 h was selected.

| Specification | HK 96 h | FVV book R 443 1986 |
|---|---|---|
| Temperature of the test liquid: | | |
| Inlet heating chamber, ° C. | 95 | 80 |
| Outlet heating chamber, ° C. | 105 | — |
| Elevated pressure, bar | 1.5 | 1.5 |
| Flow rate, l/h | 210 | 260 |
| Running time, h | 96 | 30 |
| Volume of the test liquid, l | 1 | 2.3 |
| Heating output, W | 2300 | 1500 |
| Theoretical heating surface stress, W/cm$^2$ | 75 | 50 |

| Specification | HK 96 h | FVV book R 443 1986 |
|---|---|---|
| Material samples | GAlSi6Cu4 (weight approx. 65 g) | GG-26 GAlSi10Mgwa |
| Concentration of the test liquid, % by volume | 30 | 20/40 |
| Water type | ASTM D1384 | 10° GH |

A metal package as prepared in ASTM D1384 was screwed together. If appropriate, test liquid was introduced into the vessel, so that it was flushed by the hot test liquid in circulation. The metal package consisted of the following metals and alloys, the sequence of ASTM D1384 being observed, and the additional metals were screwed next to the aluminum. The metal package consisted of alloys:

Copper F—Cu, soft solder LPbSn30(Sb), brass Ms-63, steel II, gray cast iron GG-26, G-AlSi6Cu4, AlMn, Al 99.5, G-AlSi12.

The metals were treated in a customary manner (i.e. as in ASTM D1384 or FVV R443 1986). The changes in weight were, unless stated otherwise, registered after the pickling.

Example 4

Dynamic Corrosion Experiment with HK2 with/without Glycerol

The experiment was carried out as specified in example 3.

HK2 is a mixture of 87.8 parts of ethylene glycol, 5.4 parts of aqueous sodium hydroxide solution (50% by weight), 1.3 parts of adipic acid, 5.0 parts of sebacic acid, 0.4 part of tolutriazole, and assistants (<0.2 part).

|  | HK2 with glycerol | HK2 without glycerol |
|---|---|---|
| Mixture (180 g) | 100 g of HK2 38 g of ethylene glycol 42 g of glycerol | 100 g of HK2 80 g of ethylene glycol |
| Change in weight of the aluminum specimen (round sample) HK 96 h KV23922 | 13 mg | 36 mg |

The comparison shows that the glycerol-comprising mixture leads to a better corrosion result because the change in weight of the aluminum specimen after an experimental duration of 96 h is lower.

Example 5

Dynamic Corrosion Experiment with HK3 with/without Glycerol

The experiment was carried out as specified in example 3.

HK3 is a mixture of 81.5 parts of ethylene glycol, 5.9 parts of aqueous sodium hydroxide solution (50% by weight), 5.4 parts of ethylhexanoic acid, 3.1 parts of sebacic acid, 0.03 part of stabilized silicate, 2.7 parts of borax, 0.3 part of benzotriazole, 0.7 part of sodium nitrate and assistants (<0.4 part).

|  | HK3 with glycerol | HK3 without glycerol |
| --- | --- | --- |
| Mixture (270 g) | 100 g of HK3<br>107 g of ethylene glycol<br>63 g of glycerol | 100 g of HK3<br>170 g of ethylene glycol |
| Change in temperature of the aluminum specimen (round sample) HK 96 h KV23931 | 1° C. | 5° C. |

The comparison shows that the glycerol-comprising mixture leads to a better corrosion result because the temperature increase of the aluminum specimen after an experimental duration of 96 h is lower.

What is claimed is:

1. An antifreeze/anticorrosion concentrate comprising
   (1) glycerol; wherein the amount of glycerol is from 15 to 35% by weight based on the total amount of the concentrate;
   (2) ethylene glycol; a monoether of an alcohol selected from the group consisting of a dihydric, trihydric, and polyhydric alcohols; and mixtures thereof; wherein the combined total of the (2) ethylene glycol, monoether, and mixture thereof, and the (1) glycerol is at least 75% by weight based on the total amount of the concentrate; and
   (3) an anticorrosion component; wherein the amount of anticorrosion component is from 1 to 70% by weight based on the total amount of the concentrate;
   wherein the anticorrosion component is at least one component in the specified amount, based on the total amount of the concentrate, of:
      (b) up to 5% by weight of one or more aliphatic or aromatic di- or tricarboxylic acids having in each case from 3 to 21 carbon atoms in the form of their alkali metal, ammonium or substituted ammonium salts.

2. The concentrate according to claim 1, which additionally comprises the following component in the specified amount, based on the total amount of the concentrate:
   (h) up to 1% by weight of one or more hard water stabilizers based on polyacrylic acid, polymaleic acid, acrylic acid-maleic acid copolymers, polyvinylpyrrolidone, polyvinylimidazole, vinylpyrrolidone-vinylimidazole copolymers and/or copolymers of unsaturated carboxylic acids and olefins.

3. The concentrate according to claim 1, wherein the pH of the concentrate is in the range from 4 to 11.

4. A process for preparing an antifreeze/anticorrosion concentrate comprising:
   mixing an antifreeze superconcentrate with glycerol to form the antifreeze/anticorrosion concentrate of claim 1, wherein the antifreeze superconcentrate comprises an anticorrosion component and ethylene glycol.

5. An aqueous coolant composition comprising from 10 to 90% by weight of the concentrate according to claim 1 and water.

6. A method for the frost water protection and/or corrosion protection, the method comprising applying the coolant composition according to claim 5 to a system comprising water and metal castings.

7. The concentrate of claim 1, wherein the anticorrosion component comprises
   (d) up to 5% by weight of one or more aliphatic, cycloaliphatic or aromatic amines which have from 2 to 15 carbon atoms and may optionally comprise ether oxygen atoms or hydroxyl groups.

8. The concentrate of claim 1, wherein the anticorrosion component comprises
   (e) up to 5% by weight of one or more mono- or bicyclic, unsaturated or partly unsaturated heterocycles which have from 4 to 10 carbon atoms and may optionally be benzofused and/or bear additional functional groups.

9. The concentrate of claim 1, that comprises
   (f) up to 5% by weight of one or more tetra($C_1$-$C_8$-alkoxy) silanes.

10. The concentrate of claim 1, that comprises
   (g) up to 10% by weight of one or more carboxamides or sulfonamides.

11. The concentrate of claim 2, that comprises
   (h) up to 1% by weight of one or more hard water stabilizers based on polyacrylic acid.

12. The aqueous coolant composition of claim 5, comprising from 20 to 60% by weight of the concentrate and water.

13. The concentrate according to claim 3, wherein the pH of the concentrate is 4.

14. The concentrate according to claim 3, wherein the pH of the concentrate is 11.

15. The concentrate according to claim 3, wherein the pH of the concentrate ranges from 4.5 to 8.5.

16. The concentrate according to claim 15, wherein the pH of the concentrate is 4.5.

17. The concentrate according to claim 15, wherein the pH of the concentrate is 8.5.

18. The concentrate according to claim 1; wherein the amount of
   glycerol is from 20 to 30% by weight based on the total amount of the concentrate.

19. The concentrate according to claim 1; wherein the monoether is a monoether of a glycol selected from methyl, ethyl, propyl and butyl monoethers of ethylene glycol, propylene glycol, diethylene glycol and dipropylene glycol.

20. The concentrate according to claim 1; wherein the total amount of anticorrosion component is from 2 to 35% by weight based on the total amount of the concentrate.

21. The concentrate according to claim 1; wherein the total amount of anticorrosion component is from 3 to 8% by weight based on the total amount of the concentrate.

22. The concentrate of claim 1,
   wherein the anticorrosion component (3) additionally comprises at least one component in the specified amount, based on the total amount of the concentrate, selected from the group consisting of:
      (a) up to 5% by weight of one or more aliphatic, cycloaliphatic or aromatic monocarboxylic acids having in each case from 3 to 16 carbon atoms in the form of their alkali metal, ammonium or substituted ammonium salts,
      (c) up to 1% by weight of one or more alkali metal borates, alkali metal phosphates, alkali metal silicates, alkali metal nitrites, alkali metal or alkaline earth metal nitrates, alkali metal molybdates or alkali metal or alkaline earth metal fluorides,
      (d) up to 5% by weight of one or more aliphatic, cycloaliphatic or aromatic amines which have from 2 to 15 carbon atoms and may optionally comprise ether oxygen atoms or hydroxyl groups,
      (e) up to 5% by weight of one or more mono- or bicyclic, unsaturated or partly unsaturated heterocycles which have from 4 to 10 carbon atoms and may optionally be benzofused and/or bear additional functional groups, (f) up to 5% by weight of one or more tetra($C_1$-$C_8$-alkoxy)silanes, and
(g) up to 10% by weight of one or more carboxamides or sulfonamides.

\* \* \* \* \*